(12) United States Patent
Higuchi et al.

(10) Patent No.: US 9,056,530 B2
(45) Date of Patent: Jun. 16, 2015

(54) PNEUMATIC TIRE

(71) Applicants: Keiji Higuchi, Kobe (JP); Hirokazu Takano, Kobe (JP)

(72) Inventors: Keiji Higuchi, Kobe (JP); Hirokazu Takano, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 131 days.

(21) Appl. No.: 13/867,181

(22) Filed: Apr. 22, 2013

(65) Prior Publication Data

US 2013/0292017 A1 Nov. 7, 2013

(30) Foreign Application Priority Data

May 2, 2012 (JP) .................................. 2012-105420

(51) Int. Cl.
*B60C 11/03* (2006.01)
*B60C 11/11* (2006.01)
*B60C 11/13* (2006.01)

(52) U.S. Cl.
CPC ......... *B60C 11/0304* (2013.04); *B60C 11/0309* (2013.04); *B60C 11/0306* (2013.04); *B60C 2011/0388* (2013.04); *B60C 2011/0346* (2013.04); *B60C 2011/0374* (2013.04); *B60C 2011/0372* (2013.04)

(58) Field of Classification Search
CPC ............ B60C 11/0304; B60C 11/0306; B60C 11/0309; B60C 11/04; B60C 11/042; B60C 11/11; B60C 11/13; B60C 11/1307; B60C 2011/0325; B60C 2011/0341; B60C 2011/0346; B60C 2011/0353; B60C 2011/0355; B60C 2011/133; B60C 11/0308; B60C 11/0374; B60C 11/0372

USPC ................. 152/209.3, 209.9, 209.16, 209.18, 152/209.27, 900; D12/516, 520, 548, 552, D12/583, 587
See application file for complete search history.

(56) References Cited

U.S. PATENT DOCUMENTS

| 4,635,694 | A | * | 1/1987 | Hosokawa | ................. | 152/209.9 |
| 5,421,387 | A | * | 6/1995 | Emerson | ................... | 152/209.9 |
| 2003/0226629 | A1 | * | 12/2003 | Kimishima | ............. | 152/209.18 |
| 2006/0102267 | A1 | * | 5/2006 | Takahashi et al. | ....... | 152/209.18 |
| 2008/0047643 | A1 | * | 2/2008 | Takahashi | ................ | 152/209.26 |

FOREIGN PATENT DOCUMENTS

| JP | 11-245625 | * | 9/1999 |
| JP | 2004-058839 | A | | 2/2004 |

* cited by examiner

*Primary Examiner* — Eric Hug
(74) *Attorney, Agent, or Firm* — Birch, Stewart, Kolasch & Birch, LLP

(57) ABSTRACT

A pneumatic tire comprises a tread portion provided with a shoulder main groove, shoulder lateral grooves extending from the shoulder main groove toward axially outwardly, the shoulder main groove extending in a zigzag manner comprising linear portions and curved portions which are arranged alternately in a circumferential direction of the tire, each linear portion inclined with respect to the circumferential direction of the tire, each curved portion having a radius of curvature of from 12-80 mm, the curved portion protruding toward axially outwardly of the tire, the shoulder main groove having a pair of groove edges and a circumferential space therebetween which straightly extends along the circumferential direction of the tire without coming into contact with both groove edges and the circumferential space with an axial width of from 0.2 to 0.7 times an axial groove width of the shoulder main groove.

11 Claims, 2 Drawing Sheets ically and continuously extending main groove. Since a space being surrounded between the main groove and the ground works as a pipe where air flows, pipe resonance is generated therein during tire is traveling. In order to reduce such pipe resonance in the main groove, JP-2004-058839-A1 discloses a tire tread having a zigzag main groove. However, such a tire is liable to deteriorate wet performance.

SUMMARY OF THE INVENTION

The present invention has been worked out in light of the circumstances described above, and has a main object of providing a pneumatic tire capable of improving tire noise and wet performance in well-balanced.

In accordance with the present invention, there is provided a pneumatic tire comprising a tread portion provided with a circumferentially and continuously extending shoulder main groove, a plurality of shoulder lateral grooves each extending from the shoulder main groove toward axially outwardly of the tire, and a plurality of middle lateral grooves each extending from the shoulder main groove toward axially inwardly of the tire, the shoulder main groove extending in a zigzag manner comprising linear portions and curved portions which are arranged alternately in a circumferential direction of the tire, each linear portion inclined toward axially inwardly of the tire from a circumferentially first side to a circumferentially second side at an angle with respect to the circumferential direction of the tire, the linear portion extending in a straight or in an arc having a radius of curvature in a range of not less than 200 mm, each curved portion having a radius of curvature in a range of from 12 to 80 mm, the curved portion protruding toward axially outwardly of the tire, the shoulder main groove having a pair of groove edges and a circumferential space therein which straightly extends along the circumferential direction of the tire without coming into contact with both groove edges, the circumferential space having an axial width d0 in a range of from 0.2 to 0.7 times an axial groove width d of the shoulder main groove, each shoulder lateral groove extending beyond a tread edge axially outwardly of the tire, the shoulder lateral groove having a first groove edge at the side of the circumferentially first side, each middle lateral groove extending from a corner between the linear portion and the curved portion so as to be smoothly connected to the curved portion, the middle lateral groove having a first groove edge at the side of the circumferentially first side, and a circumferential distance La from a first intersection point where the first groove edge of the middle lateral groove and an axially inner groove edge of the shoulder main groove cross each other to a second intersection point where the first groove edge of the shoulder lateral groove and an axially outer groove edge of the shoulder main groove cross each other at the side of the circumferentially second side being in a range of from 1.1 to 2.0 times a circumferential width Lb of a groove intersection where the middle lateral groove and the shoulder main groove cross each other.

DETAILED DESCRIPTION

An embodiment of the present invention will be explained below with reference to the accompanying drawings.

Figure 1:
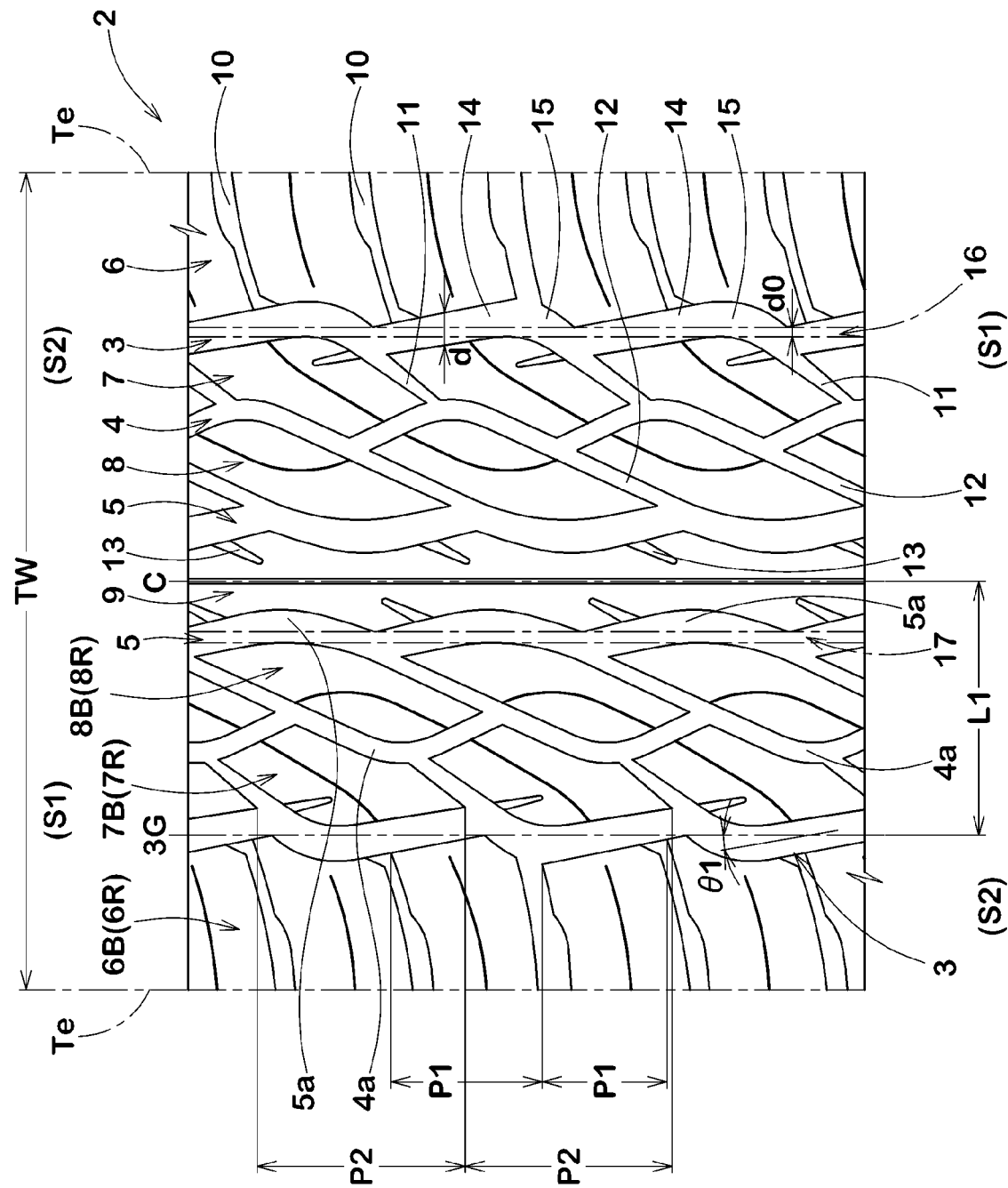
FIG. 1 is a development view of a tread portion showing an embodiment of the present invention.

Referring to FIG. 1, a pneumatic tire 1 in accordance with the present embodiment is illustrated as an all-terrain tire for four-wheel drive vehicle. The tire 1 has a tread portion 2 provided with: a pair of shoulder grooves 3, 3, each of which circumferentially and continuously extends and is disposed the nearest side of a tread edge Te; a pair of middle main grooves 4, 4 each of which circumferentially and continuously extends and is disposed axially inwardly of the shoulder main groove 3; and a pair of crown main grooves 5, 5 each of which circumferentially and continuously extends and is disposed axially inwardly of the middle main grooves 4. Thus, the tread portion 2 is divided into a pair of shoulder portions 6 each of which is between the shoulder main groove 3 and the tread edge Te on both sides of a tire equator C, a pair of outer-middle portions each of which between the shoulder main groove 3 and the middle main groove 4 on both sides of the tire equator C, a pair of inner-middle portions each of which is between the middle main groove 4 and the crown main groove 5 on both sides of the tire equator C, and a crown portion 9 between the crown main grooves 5, 5.

Here, the tread edges Te are the axial outermost edges of the ground contacting patch of the tire which occurs under a normally inflated loaded condition.

The normally inflated loaded condition is such that the tire is mounted on a standard wheel rim with a camber angle of zero and inflated to a standard pressure and loaded with a standard tire load.

The standard wheel rim means a wheel rim officially approved or recommended for the tire by standards organizations, the standard wheel rim is the "standard rim" specified in JATMA, the "Measuring Rim" in ETRTO, and the "Design Rim" in TRA or the like, for example.

The standard pressure means the "maximum air pressure" in JATMA, the "Inflation Pressure" in ETRTO, and the maximum pressure given in the "Tire Load Limits at Various Cold Inflation Pressures" table in TRA or the like.

The standard load is the "maximum load capacity" in JATMA, the "Load Capacity" in ETRTO, and the maximum value given in the above-mentioned table in TRA or the like.

In case of passenger car tires, however, the standard pressure and standard tire load are uniformly defined by 180 kPa and 88% of the maximum tire load, respectively.

A tread width TW is defined as an axial width between the tread edges Te, Te under a normally inflated unloaded condition such that the tire is mounted on the standard wheel rim and inflate to the standard pressure but loaded with no tire load. In this application including specification and claims, various dimensions, positions and the like of the tire refer to those under the normally inflated unloaded condition of the tire unless otherwise noted.

The shoulder portion 6 is provided with a plurality of shoulder lateral grooves 10 each of which extends from the shoulder main groove 3 toward axially outwardly of the tire beyond the tread edge Te. Thus, the shoulder portion 6 is divided into a plurality of shoulder blocks 6B arranged in a circumferential direction of the tire to form a shoulder block row 6R.

The outer-middle portion 7 is provided with a plurality of middle lateral grooves 11 each of which extends from the shoulder main groove 3 to the middle main groove 4. Thus, the outer-middle portion 7 is divided into a plurality of outer-middle blocks 7B arranged in the circumferential direction of the tire to form an outer-middle block row 7R.

The inner-middle portion 8 is provided with a plurality of inner-middle lateral grooves 12 each of which extends from the middle main groove 4 to the crown main groove 5. Thus, the inner-middle portion 8 is divided into a plurality of inner-middle blocks 7B arranged in the circumferential direction of the tire to form an inner-middle block row 8R.

The crown portion 9 is provided with a plurality of inclined slots 13 which extend from both crown main grooves 5 toward axially inwardly without reaching the tire equator C. Thus, the crown portion 9 is formed as a rib extending continuously in the circumferential direction of the tire.

Referring to FIG. 1, the tread pattern in accordance with the present embodiment is substantially point symmetry with respect to a point on the tire equator C except for variable pitches.

Figure 2A:
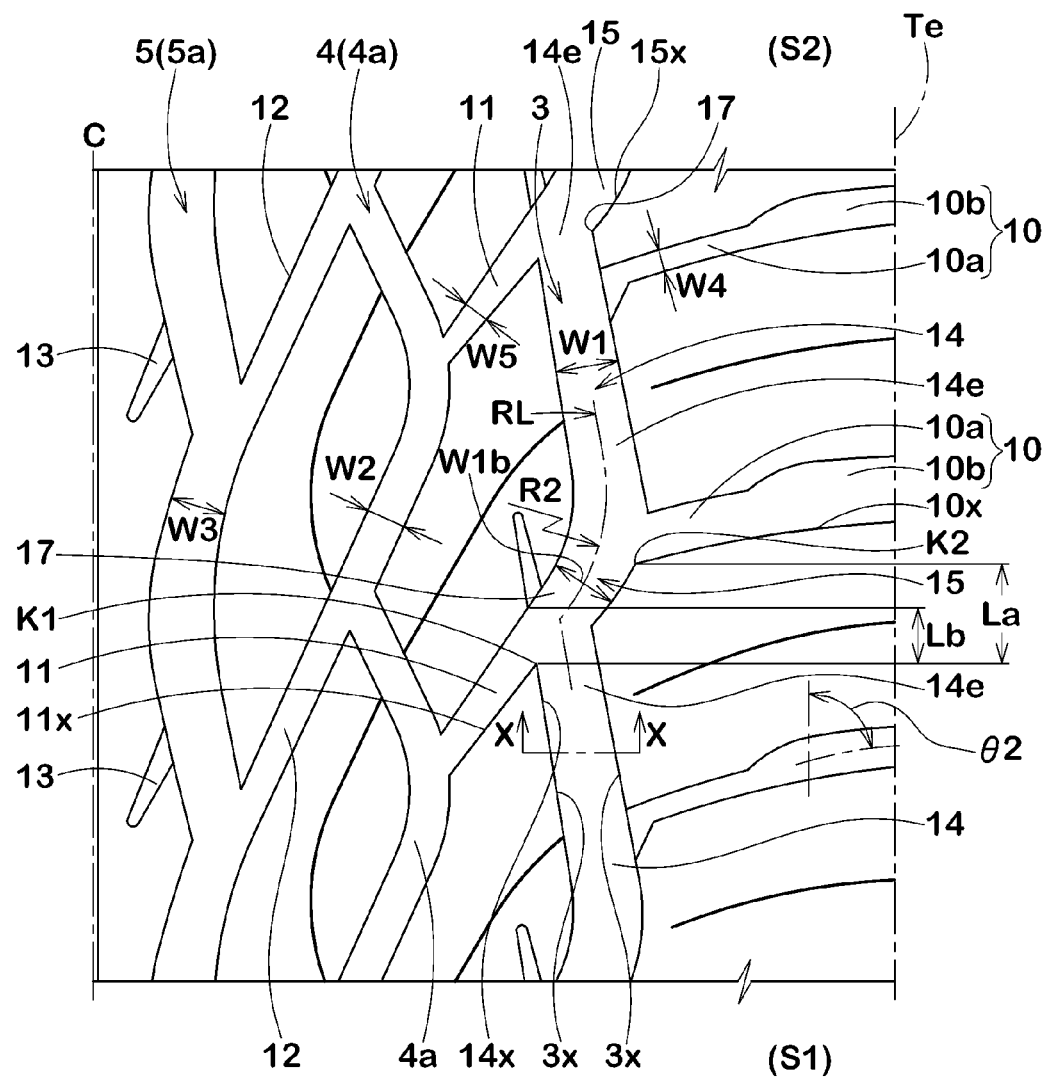
FIG. 2A is an enlarged development view of a right side of FIG. 1.

Referring to FIG. 2A, the shoulder main groove 3 extends in a zigzag manner on both sides of the tire equator C. The shoulder main groove 3 comprises linear portions 14 and curved portions 15 which are arranged alternately in a circumferential direction of the tire. Each linear portion 14 has a straight shape or an arc shape having a radius of curvature R1 in a range of not less than 200 mm so as to reduce drainage resistance. Each curved portion 15 has an arc shape protruding toward axially outwardly of the tire so as to reduce resonance noise by offering to disturb vibration of air in the groove. The shoulder main groove 3 also has an axially outer groove edge having a sharpened corner 17 protruding toward axially inwardly of the tire in between the linear portion 14 and the curved portion 15 so that pipe resonance is disturbed. Such shoulder main groove 3 improves wet performance of the tire while reducing tire noise.

Referring to FIG. 1, in order to further reduce such resonance noise, the linear portion 14 inclines toward axially inwardly of the tire from a circumferentially first side S1 to a circumferentially second side S2 at an angle θ1 with respect to the circumferential direction of the tire.

Preferably, the angle θ1 of the linear portion 14 is in a range of from 5 to 15 degrees in order to further improve wet performance while reducing tire noise.

The curved portion 15 has a radius of curvature R2 in a range of from 12 to 80 mm. when the radius of curvature R2 of the curved portion 15 is more than 80 mm, the advantage for reducing tire noise by offering a curved groove edge 15x thereof may be difficult to obtain. When the radius of curvature R2 of the curved portion 15 is less than 12 mm, a large drainage resistance may occur. More preferably, the radius of curvature R2 of the curved portion 15 is in a range of from 20 to 70 mm.

Preferably, the curved portion 15 has a groove width w1b which is gradually increasing toward axially outwardly of the tire to improve drainage performance. In this specification and claims, the groove width means a width measured at right angle with respect to the longitudinal direction of the groove.

Figure 2B:
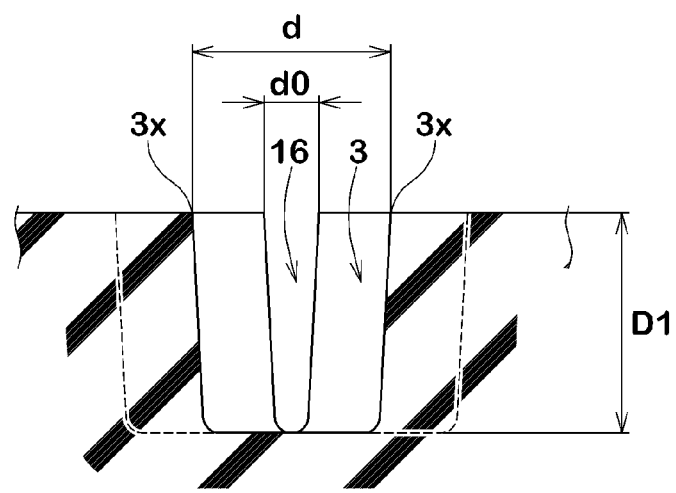
FIG. 2B is a cross sectional view taken along a line X-X of FIG. 1.

Referring to FIGS. 1 and 2B, the shoulder main groove 3 has a pair of groove edges 3x, 3x and a circumferential space 16 therein which straightly extends along the circumferential direction of the tire without coming into contact with both groove edges 3x, 3x. Since the circumferential space 16 smoothly drains the water backwardly when driving straight ahead, drainage performance of the tire is improved.

In order to further improve drainage performance of the tire while reducing tire noise due to the shoulder main groove 3, the circumferential space preferably has an axial width d0 in a range of from 0.2 to 0.7 times an axial width d of the shoulder main groove 3. The axial width d0 is more preferably in a range of not less than 0.3 times, still further preferably not less than 0.4 times, but preferably not more than 0.6 times, more preferably not more than 0.5 times the axial width d of the shoulder main groove 3.

Referring to FIG. 2A, the shoulder main groove 3 preferably has a groove width w1 in a range of from 3.5% to 8.5% of the tread width TW in order to improve drainage performance while reducing tire noise. Similarly, referring to FIG. 2B, the shoulder main groove 3 has a groove depth D1 in a range of from 8.0 to 12.0 mm.

Referring to FIG. 1, the shoulder main groove 3 has a zigzag-amplitude centerline 3G which is preferably located in an axial distance in a range of from not less than 20%, more preferably not less than 25%, but preferably not more than 40%, more preferably not more than 35% of the tread width TW from the tire equator C.

The middle main groove 4 is a zigzag groove comprising a plurality of repeated curved portions 4a each of which protrudes axially outwardly of the tire.

The crown main groove 5 in accordance with the present embodiment is a zigzag groove comprising a plurality of repeated curved portions 5a each of which protrudes axially inwardly of the tire. The crown main groove 5 has a pair of groove edges and a circumferential space 17 therebetween which straightly extends along the circumferential direction of the tire without coming into contact with both groove edges thereof. Since the circumferential space 17 smoothly drains the water backwardly when driving straight ahead, drainage performance of the tire is further improved.

Referring to FIG. 2A, the groove width w2 of the middle main groove 4 and the groove width w3 of the crown main groove 5 are preferably in a range of from 50% to 120% of the groove width w1 of the shoulder main groove 3 in order to further improve the advantage above, and groove depths of middle and crown main grooves 4, 5 are preferably in a range of from 90% to 110% of the groove depth of the shoulder main groove 3. However, the middle and crown main grooves 4, 5 are not particularly limited in these configurations.

Each shoulder lateral groove 10 has a first groove edge 10x at the side of the circumferentially first side S1. The shoulder lateral groove 10 extends from the shoulder main groove to axially outwardly of the tire beyond the tread edge Te in order to improve drainage performance. Preferably, the shoulder lateral groove 10 has an angle θ2 in a range of from 60 to 85 degrees with respect to the circumferential direction of the tire so that drainage performance of the tire is improved when driving cornering.

Each shoulder lateral groove 10 comprises an axially inner narrow portion 10a and an axially outer wide portion 10b having a groove width larger than that of the inner narrow portion 10a. The shoulder lateral groove 10 may effectively drain the water using the axially outer wide portion 10b. Additionally, tire noise due to the shoulder lateral groove 10 is reduced, since the axially inner narrow portion 10a has a small groove width so that resonance noise is prevented.

In this embodiment, the shoulder lateral grooves 10 include at least one shoulder lateral groove 10 which extends from the linear portion 14 and at least one shoulder lateral groove 10 which extends from the curved portion 15.

Each middle lateral groove 11 has a first groove edge 11x at the side of the circumferentially first side S1. The middle lateral groove 11 extends from a corner 14e between an end of the linear portion 14 at the circumferentially second side s2 and the curved portions 15 so as to be smoothly connected to the curved portion 15. Such a middle lateral groove 11 may disperse and drain the water toward the tread edge Te through the shoulder lateral groove 10.

Additionally, the middle lateral groove 11 is connected to around a peak of the middle main groove 4 which protrudes axially outmost of the tire to improve drain efficiency thereof by offering a short groove length.

The tread portion 2 is provided with a first intersection point K1 where the first groove edge 11x of the middle lateral groove 11 and the axially inner groove edge 3x of the shoulder main groove 10 cross each other. The tread portion 2 is also provided with a second intersection point K2 where the first groove edge 10x of the shoulder lateral groove 10 and the axially outer groove edge 3x of the shoulder main groove 3 cross each other.

A circumferential distance La from the first intersection point K1 to the second intersection point K2 located the side of the circumferentially second side S2 is in a range of from 1.1 to 2.0 times a circumferential width Lb of a groove intersection where the middle lateral groove 11 and the shoulder main groove 3 cross each other. When the circumferential distance La is less than 1.1 times the circumferential width Lb of the groove intersection, especially less than or equal to 1.0 times, resonance noise generated in the middle main groove 4 is liable to directly leak through shoulder lateral grooves to the tread edge Te without being disturbed by the groove edges 3x of shoulder main groove 3. Thus, noise performance of the tire is deteriorated. When the circumferential distance La is more than 2.0 times the circumferential width Lb of the groove intersection, drainage performance of the tire is liable to deteriorate, since the water in the middle main groove 4 is difficult to drain toward the tread edge Te.

Referring to FIG. 1, pitches P2 of middle lateral grooves 11 are preferably larger than pitches P1 of shoulder lateral grooves 10. Thus, tire 1 in accordance with the present invention may smoothly drain the water toward the tread edge Te. Additionally, resonance noise generated in middle lateral grooves 11 is divided to pass through shoulder lateral grooves 10 so that tire noise is reduced. In order to further improve drainage performance of the tire, a ratio P2/P1 of the pitch P2 of the middle lateral groove 11 to the pitch P1 of the shoulder lateral groove 10 is in a range of from 1.25 to 1.75.

Groove widths w4, w5 of shoulder and middle lateral grooves 10, 11 are preferably in a range of from 2.0 to 8.0 mm in order to improve drainage performance and noise performance of the tire in well-balanced. Similarly, groove depths of shoulder and middle lateral grooves 10, 11 are preferably in a range of from 7.5 to 11.0 mm.

Each inner-middle lateral grooves 12 extends so as to smoothly connect between an end of the curved portion 4a of the middle main groove 4 and an end of the curved portion 5a of the crown main groove 5 so that a continuously and smoothly extending portion between an axially outermost peak of the middle main groove 4 and an axially innermost peak of the crown main groove 5 is formed. Thus, drainage performance around the tire equator C is improved.

The present invention is more specifically described and explained by means of the following Examples and References. It is to be understood that the present invention is not limited to these Examples.

Comparison Test

Pneumatic tires each having a tire size of 275/55R20 with a basic tread pattern of FIG. 1 except for the detail shown in Table 1 were made and tested with respect to drainage performance and noise performance. The major specifications of tires are as follows.

Tread width TW: 220 mm
Shoulder Main Groove
    Groove width W1: 5.0 to 8.0 mm
    Groove depth D1: 11.0 mm
    Ratio L1/TW: 30%
Shoulder Lateral Groove
    Groove width W4: 2.5 to 7.5 mm
    Groove depth D4: 9.5 mm
Middle Lateral Groove
    Groove width W5: 3.0 to 5.0 mm
    Groove depth D5: 8.0 mm
Middle Main Groove
    Groove depth ratio D2/D1: 100%
Crown Main Groove
    Groove depth ratio D3/D1: 100%

Test methods are as follows.

Drainage Performance Test (Lateral Hydroplaning Test):

Each test tire mounted on a rim of 20×9 J with an internal pressure of 230 kPa was installed on a test vehicle with four-wheel drive having a displacement of 5,600 cc. Then, the test vehicle was entered into a course with a water puddle 10 mm deep and 20 m long, on an asphalt road surface with a radius of 100 m, with stepwise speed increase. Then, lateral acceleration (lateral G) of the vehicle was measured, and average lateral G of the front wheels at speeds of 55 to 80 km/h was calculated. Calculation results are shown with an index of 100 representing a value in Ref. 1. Larger the values, the better the performance is.

Tire Noise Test:

The foregoing test vehicle was run at a speed of 60 km/h on a road noise measurement road (rough asphalt road surface), and internal vehicle noise was picked up through a microphone installed near the driver's ear on the window side, and then a sound pressure level of a peak value of pipe resonance was measured around a narrow band of 240 Hz. Evaluation results are shown with an index of 100 representing a value in Ref. 1. Larger the values, the better the performance is.

Test results are shown in Table 1.

TABLE 1

|  | Ref. 1 | Ex. 1 | Ex. 2 | Ref. 2 | Ex. 3 | Ref. 3 | Ex. 4 | Ex. 5 | Ex. 6 | Ex. 7 |
| --- | --- | --- | --- | --- | --- | --- | --- | --- | --- | --- |
| Radius of curvature of curved portion R2 (mm) | 10 | 12 | 80 | 84 | 46 | 46 | 46 | 46 | 46 | 46 |
| Ratio d0/d (%)* | 0.45 | 0.45 | 0.45 | 0.45 | 0.45 | 0.1 | 0.2 | 0.3 | 0.4 | 0.5 |
| Ratio La/Lb | 1.6 | 1.6 | 1.6 | 1.6 | 1.6 | 1.6 | 1.6 | 1.6 | 1.6 | 1.6 |
| Ratio P2/P1 | 1.5 | 1.5 | 1.5 | 1.5 | 1.5 | 1.5 | 1.5 | 1.5 | 1.5 | 1.5 |
| Tire noise test (Index) | 100 | 100 | 95 | 85 | 100 | 110 | 105 | 103 | 101 | 99 |
| Drainage performance (Index) | 100 | 115 | 125 | 125 | 120 | 100 | 110 | 115 | 119 | 121 |

TABLE 1-continued

| | Ex. 8 | Ex. 9 | Ref. 4 | Ref. 5 | Ex. 10 | Ex. 11 | Ref. 6 | Ex. 12 | Ex. 13 | Ex. 14 | Ex. 15 |
|---|---|---|---|---|---|---|---|---|---|---|---|
| Radius of curvature of curved portion R2 (mm) | 46 | 46 | 46 | 46 | 46 | 46 | 46 | 46 | 46 | 46 | 46 |
| Ratio d0/d (%)* | 0.6 | 0.7 | 0.8 | 0.45 | 0.45 | 0.45 | 0.45 | 0.45 | 0.45 | 0.45 | 0.45 |
| Ratio La/Lb | 1.6 | 1.6 | 1.6 | 1 | 1.1 | 2 | 2.5 | 1.6 | 1.6 | 1.6 | 1.6 |
| Ratio P2/P1 | 1.5 | 1.5 | 1.5 | 1.5 | 1.5 | 1.5 | 1.5 | 1.1 | 1.25 | 1.75 | 2 |
| Tire noise test (Index) | 97 | 95 | 85 | 90 | 95 | 105 | 106 | 98 | 99 | 102 | 101 |
| Drainage performance (Index) | 122 | 123 | 125 | 120 | 120 | 110 | 104 | 121 | 121 | 118 | 116 |

*At intersection between middle lateral groove and shoulder main groove
d0: Axial width of circumferential space 16
d: Axial width of shoulder main groove
La: Circumferential distance from first intersection point K1 to second intersection point K2
Lb: Circumferential width of groove intersection where middle lateral groove and shoulder main groove cross each other
P2: Pitch of middle lateral grooves
P1: Pitch of shoulder lateral grooves From the test results, it was confirmed that Example tires in accordance with the present invention can be effectively improved tire noise as well as drainage performance.

The invention claimed is:

1. A pneumatic tire comprising
a tread portion provided with a circumferentially and continuously extending shoulder main groove, a plurality of shoulder lateral grooves each extending from the shoulder main groove toward axially outwardly of the tire, and a plurality of middle lateral grooves each extending from the shoulder main groove toward axially inwardly of the tire,
the shoulder main groove extending in a zigzag manner comprising linear portions and curved portions which are arranged alternately in a circumferential direction of the tire,
each linear portion inclined toward axially inwardly of the tire from a circumferentially first side to a circumferentially second side at an angle with respect to the circumferential direction of the tire, the linear portion extending in a straight or in an arc having a radius of curvature in a range of not less than 200 mm,
each curved portion having a radius of curvature in a range of from 12 to 80 mm, the curved portion protruding toward the axially outward direction of the tire, wherein the curved portion has a groove width gradually increasing toward the axially outward direction of the tire,
the shoulder main groove having a pair of groove edges and a circumferential space therein which straightly extends along the circumferential direction of the tire without coming into contact with both groove edges,
the circumferential space having an axial width d0 in a range of from 0.2 to 0.7 times an axial groove width d of the shoulder main groove,
each shoulder lateral groove extending beyond a tread edge axially outwardly of the tire, the shoulder lateral groove having a first groove edge at the side of the circumferentially first side,
each middle lateral groove extending from a corner between the linear portion and the curved portion so as to be smoothly connected to the curved portion, the middle lateral groove having a first groove edge at the side of the circumferentially first side, and
a circumferential distance La from a first intersection point where the first groove edge of the middle lateral groove and an axially inner groove edge of the shoulder main groove cross each other to a second intersection point where the first groove edge of the shoulder lateral groove and an axially outer groove edge of the shoulder main groove cross each other at the side of the circumferentially second side being in a range of from 1.1 to 2.0 times a circumferential width Lb of a groove intersection where the middle lateral groove and the shoulder main groove cross each other.

2. The tire according to claim 1, wherein
the shoulder main groove has a groove width in a range of from 3.5% to 8.5% of a tread width.

3. The tire according to claim 1, wherein
pitches of middle lateral grooves are larger than pitches of shoulder lateral grooves.

4. The tire according to claim 1, wherein
the angle of the linear portion is in a range of from 5 to 15 degrees.

5. The tire according to claim 1, wherein
each shoulder lateral groove comprises an axially inner narrow portion and an axially outer wide portion having a groove width larger than that of the axially inner narrow portion.

6. The tire according to claim 1, wherein
the shoulder lateral grooves include at least one shoulder lateral groove which extends from the linear portion and at least one shoulder lateral groove which extends from the curved portion.

7. The tire according to claim 1, wherein
the tread portion is provided with a circumferentially and continuously extending middle main groove disposed axially inwardly of the shoulder main groove, and
the middle main groove is a zigzag groove comprising a plurality of repeated curved portions each of which protrudes axially outwardly of the tire.

8. The tire according to claim 7, wherein
the tread portion is provided with a circumferentially and continuously extending crown main groove disposed axially inwardly of the middle main groove, and
the crown main groove is a zigzag groove comprising a plurality of repeated curved portions each of which protrudes axially inwardly of the tire.

9. The tire according to claim 8, wherein
a plurality of inner-middle lateral grooves are provided between the crown main groove and the middle main groove,
each inner-middle lateral groove extends so as to smoothly connect between an end of the curved portion of the middle main groove and an end of the curved portion of the crown main groove so that a continuously and smoothly extending portion between an axially outermost peak of the middle main groove and an axially innermost peak of the crown main groove is formed.

10. A pneumatic tire comprising a tread portion provided with a circumferentially and continuously extending shoulder main groove, a plurality of shoulder lateral grooves each extending from the shoulder main groove toward axially outwardly of the tire, and a plurality of middle lateral grooves each extending from the shoulder main groove toward axially inwardly of the tire, the shoulder main groove extending in a zigzag manner comprising linear portions and curved portions which are arranged alternately in a circumferential direction of the tire, each linear portion inclined toward axially inwardly of the tire from a circumferentially first side to a circumferentially second side at an angle with respect to the circumferential direction of the tire, the linear portion extending in a straight or in an arc having a radius of curvature in a range of not less than 200 mm, wherein the angle of the linear portion is in a range of from 5 to 15 degrees, each curved portion having a radius of curvature in a range of from 12 to 80 mm, the curved portion protruding toward the axially outward direction of the tire, the shoulder main groove having a pair of groove edges and a circumferential space therein which straightly extends along the circumferential direction of the tire without coming into contact with both groove edges, the circumferential space having an axial width d0 in a range of from 0.2 to 0.7 times an axial groove width d of the shoulder main groove, each shoulder lateral groove extending beyond a tread edge axially outwardly of the tire, the shoulder lateral groove having a first groove edge at the side of the circumferentially first side, each middle lateral groove extending from a corner between the linear portion and the curved portion so as to be smoothly connected to the curved portion, the middle lateral groove having a first groove edge at the side of the circumferentially first side, and a circumferential distance La from a first intersection point where the first groove edge of the middle lateral groove and an axially inner groove edge of the shoulder main groove cross each other to a second intersection point where the first groove edge of the shoulder lateral groove and an axially outer groove edge of the shoulder main groove cross each other at the side of the circumferentially second side being in a range of from 1.1 to 2.0 times a circumferential width Lb of a groove intersection where the middle lateral groove and the shoulder main groove cross each other.

11. A pneumatic tire comprising a tread portion provided with a circumferentially and continuously extending shoulder main groove, a plurality of shoulder lateral grooves each extending from the shoulder main groove toward axially outwardly of the tire, and a plurality of middle lateral grooves each extending from the shoulder main groove toward axially inwardly of the tire, the shoulder main groove extending in a zigzag manner comprising linear portions and curved portions which are arranged alternately in a circumferential direction of the tire, each linear portion inclined toward axially inwardly of the tire from a circumferentially first side to a circumferentially second side at an angle with respect to the circumferential direction of the tire, the linear portion extending in a straight or in an arc having a radius of curvature in a range of not less than 200 mm, each curved portion having a radius of curvature in a range of from 12 to 80 mm, the curved portion protruding toward the axially outward direction of the tire, the shoulder main groove having a pair of groove edges and a circumferential space therein which straightly extends along the circumferential direction of the tire without coming into contact with both groove edges, the circumferential space having an axial width d0 in a range of from 0.2 to 0.7 times an axial groove width d of the shoulder main groove, each shoulder lateral groove extending beyond a tread edge axially outwardly of the tire, the shoulder lateral groove having a first groove edge at the side of the circumferentially first side, wherein each shoulder lateral groove comprises an axially inner narrow portion and an axially outer wide portion having a groove width larger than that of the axially inner narrow portion, each middle lateral groove extending from a corner between the linear portion and the curved portion so as to be smoothly connected to the curved portion, the middle lateral groove having a first groove edge at the side of the circumferentially first side, and a circumferential distance La from a first intersection point where the first groove edge of the middle lateral groove and an axially inner groove edge of the shoulder main groove cross each other to a second intersection point where the first groove edge of the shoulder lateral groove and an axially outer groove edge of the shoulder main groove cross each other at the side of the circumferentially second side being in a range of from 1.1 to 2.0 times a circumferential width Lb of a groove intersection where the middle lateral groove and the shoulder main groove cross each other.

* * * * *